(12) United States Patent
Jermann et al.

(10) Patent No.: US 8,450,919 B2
(45) Date of Patent: May 28, 2013

(54) DISCHARGE LAMP AND ILLUMINANT COMPOUND FOR A DISCHARGE LAMP

(75) Inventors: Frank Jermann, Königsbrunn (DE);
Armin Konrad, Großaitingen (DE);
Martin Zachau, Geltendorf (DE)

(73) Assignee: OSRAM Gesellschaft mit beschränkter Haftung, Munich (DE)

( * ) Notice: Subject to any disclaimer, the term of this patent is extended or adjusted under 35 U.S.C. 154(b) by 0 days.

(21) Appl. No.: 12/452,129

(22) PCT Filed: Jul. 9, 2008

(86) PCT No.: PCT/EP2008/058894
§ 371 (c)(1),
(2), (4) Date: Dec. 16, 2009

(87) PCT Pub. No.: WO2009/010430
PCT Pub. Date: Jan. 22, 2009

(65) Prior Publication Data
US 2010/0102703 A1    Apr. 29, 2010

(30) Foreign Application Priority Data

Jul. 16, 2007    (DE) .......................... 10 2007 033 028

(51) Int. Cl.
*H01J 1/62*    (2006.01)
*H01J 63/04*    (2006.01)

(52) U.S. Cl.
USPC ............ 313/486; 313/483; 313/484; 313/485

(58) Field of Classification Search
None
See application file for complete search history.

(56) References Cited

U.S. PATENT DOCUMENTS

| 5,049,779 | A | 9/1991 | Itsuki et al. |
| 5,422,538 | A | 6/1995 | Ouwerkerk et al. |
| 7,030,549 | B2 | 4/2006 | Dutta |
| 7,119,488 | B2 | 10/2006 | Soules et al. |
| 7,538,495 | B2 * | 5/2009 | Wada et al. .................. 313/635 |
| 7,696,685 | B2 * | 4/2010 | Yamakawa .................. 313/503 |
| 7,696,694 | B2 | 4/2010 | Vossen et al. |
| 2004/0095058 | A1 | 5/2004 | Dutta |
| 2004/0113539 | A1 | 6/2004 | Soules et al. |
| 2007/0132360 | A1 | 6/2007 | Hildenbrand et al. |

(Continued)

FOREIGN PATENT DOCUMENTS

| CN | 1672239 A | 9/2005 |
| EP | 1 428 863 A1 | 6/2004 |

(Continued)

OTHER PUBLICATIONS

Office Action dated Jan. 26, 2012 in JP 2010-516462.

(Continued)

*Primary Examiner* — Natalie Walford
(74) *Attorney, Agent, or Firm* — Holtz, Holtz, Goodman & Chick, PC

(57) ABSTRACT

The invention relates to an illuminant compound for a discharge lamp (1), said compound having an emission spectrum in the green spectral range and being designed to absorb the radiation emitted in the visible spectral range by an Hg source and to convert said visible radiation of the Hg source into the emission spectrum of the illuminant compound. The invention also relates to a discharge lamp comprising an illuminant compound of this type.

12 Claims, 2 Drawing Sheets

U.S. PATENT DOCUMENTS

| | | | |
|---|---|---|---|
| 2009/0091235 A1* | 4/2009 | Matsuo et al. | 313/486 |
| 2009/0096958 A1* | 4/2009 | Matsuura et al. | 349/70 |
| 2010/0102704 A1 | 4/2010 | Jermann et al. | |
| 2010/0141114 A1 | 6/2010 | Jermann et al. | |

FOREIGN PATENT DOCUMENTS

| | | |
|---|---|---|
| EP | 2007P11614 | 11/2010 |
| JP | 9-7545 A | 1/1997 |
| JP | 10-106494 A | 4/1998 |
| JP | 2000-067813 A | 3/2000 |
| JP | 2001-200249 A | 7/2001 |
| JP | 2003-234089 A | 8/2003 |
| JP | 2004-507040 A | 3/2004 |
| JP | 2005-008844 A | 1/2005 |
| JP | 2005-213288 A | 8/2005 |
| JP | 2006-098034 A | 4/2006 |
| JP | 2006-190658 A | 7/2006 |
| WO | WO 02/15215 A1 | 2/2002 |
| WO | WO 2005/045881 A1 | 5/2005 |
| WO | WO 2006/051768 A1 | 5/2006 |
| WO | WO 2006095284 A1 | 9/2006 |
| WO | WO 2007013688 A2 * | 2/2007 |
| WO | WO 2007/054875 A1 | 5/2007 |
| WO | WO 2007/066733 A | 6/2007 |
| WO | WO 2007111246 A1 * | 10/2007 |

OTHER PUBLICATIONS

Office Action dated Aug. 3, 2011 in EP 0878600.1.
Response to said Office Action dated Aug. 3, 2011 in EP 0878600.

* cited by examiner

| Group | x | y | lam_dom, nm | Saturation % |
|---|---|---|---|---|
| Sr-SION: Eu 1% (TF 92a/05) | 0.328 | 0.605 | 554.1 | 82% |
| Sr-SION: Eu 2% (TF 93a/05) | 0.337 | 0.610 | 555.5 | 86% |
| L145P Ch. 19 | 0.329 | 0.532 | 555.3 | 61% | ns
DISCHARGE LAMP AND ILLUMINANT COMPOUND FOR A DISCHARGE LAMP

This application is a U.S. National Phase Application under 35 USC 371 of International Application PCT/EP2008/058894, filed Jul. 9, 2008, which is incorporated herein in its entirety by this reference.

TECHNICAL FIELD

The invention relates to a phosphor compound for a discharge lamp and to a discharge lamp, in particular to an Hg low-pressure discharge lamp.

PRIOR ART

For discharge lamps which are subjected to a relatively low thermal load and have a discharge current of less than 200 mA, films are provided as color filter on the outer side of the discharge vessel of the discharge lamp in order to increase the color saturation. For this purpose, a green film is provided for color saturation of a green fluorescent lamp. For discharge lamps which are subjected to a low thermal load and have a discharge current of less than 200 mA, pigmented films or films provided with a dye, for example made from PET, PC or VPA, can be used.

For discharge lamps which are subjected to a relatively high thermal load and have, for example, a discharge current of greater than 300 mA, a correspondingly pigmented silicone rubber can be used. One disadvantage with these solutions can be considered to be the fact that the additional coating on the outer side results in an embodiment which is more expensive than one in which the coating is applied to the inner side of the discharge lamp. In addition, the filter effect of the colored sleeve material results in a relatively low luminous efficiency.

DESCRIPTION OF THE INVENTION

The object of the present invention is to provide a phosphor compound and a discharge lamp which can be produced at reduced cost and furthermore makes possible a relatively high luminous efficiency.

This object is achieved by a phosphor compound having the features according to a first embodiment of the invention and by a discharge lamp having the features according to a second embodiment of the invention.

A phosphor compound according to the invention for a discharge lamp has an emission spectrum in the green spectral region and is capable to absorb a radiation emitted by an Hg (mercury) source in the visible spectral region and to convert this visible radiation from the Hg source into the emission spectrum of the phosphor compound. As a result of this phosphor compound, a substantially higher color saturation of a discharge lamp producing green light can be achieved. Furthermore, the production of more compact lamp types with the same emission in comparison with discharge lamps known from the prior art can be achieved. In particular, compact fluorescent lamps without an envelope can thus be formed and produced in an improved manner.

This phosphor compound can also improve the efficiency of discharge lamps emitting green light.

Preferably, the phosphor compound is designed to be free from Tb (terbium) and free from Mn (manganese). As a result, a phosphor compound with reduced costs which contributes to the improved efficiency of the discharge lamp can also be produced.

The phosphor compound according to the invention therefore has an emission response at which a suitable spectrum with the appropriate color locus can be emitted, and in addition the visible Hg V is radiation of an Hg source is not only absorbed, but can be converted into the emission spectrum of the phosphor compound. By absorption and conversion of this visible Hg radiation, increased color saturation with at the same time increased efficiency of the discharge lamp is achieved in comparison with solutions with absorbing color filters known from the prior art. There is then no need for a color filter.

Preferably, the phosphor compound is designed in such a way that it has a very high level of absorption for radiation with a wavelength of approximately 254 nm. Radiation with such a wavelength is emitted as primary intensity in the case of mercury low-pressure discharge in an Hg low-pressure discharge lamp. A very high level of absorption is characterized by the fact that the reflection of a pressed powder tablet is less than 40% when measured in 45°/0° geometry relative to an $Al_2O_3$ standard.

The phosphor compound is furthermore preferably designed in such a way that it has a high level of absorption for radiation with a wavelength of less than 440 nm. In this case, a high level of absorption means that the reflection of a pressed powder tablet is less than 60% when measured with 45°/0° geometry relative to an $Al_2O_3$ standard.

Preferably, the phosphor compound is designed in such a way that it has a low level of absorption for radiation with a wavelength of greater than 530 nm. A low level of absorption means that the reflection of a pressed powder tablet is more than 90% when measured with 45°/0° geometry relative to an $Al_2O_3$ standard.

Preferably, the emission spectrum of the phosphor compound has a dominant wavelength of between 500 nm and 565 nm. In particular, the phosphor compound has a dominant wavelength in the region of 555 nm. As a result, discharge lamps which emit green light in particular and have a dominant emission wavelength in the region of 555 nm can be provided which can be designed to have a color saturation of greater than 80%. This is a substantial increase in the color saturation since lamps known from the prior art with an emission spectrum in said wavelength region only reach a color saturation of up to a maximum of 60%. Furthermore, in the case of a lamp with such a phosphor compound, an increased luminous efficiency can be made possible.

Preferably, the half width at maximum of the emission bands of the phosphor compound according to the invention is less than 100 nm.

Preferably, the phosphor compound comprises an orthosilicate as a constituent. Preferably, the orthosilicate is formed from the formula $(Ba,Sr,Ca)_2SiO_4$.

Preferably, provision can also be made for the phosphor compound to comprise, as a constituent, a phosphor from the class of nitrides or oxynitrides, in particular $(Sr_{1-x-y}Ba_xCa_y)Si_2O_2N_2$:Eu, which is referred to as SrSiON for short below. It is precisely these two advantageous different constituents of the phosphor compound which each make it possible to achieve the increase in the color saturation of a green discharge lamp with an increased luminous efficiency.

Preferably, the phosphor compound, in particular the constituents of the phosphor compound, is doped with Eu (europium). The weight fraction of the Eu doping is preferably between 0.1% and 15%, in particular between 0.2% and 2%. In particular, the weight fraction of the Eu doping is between 1% and 2%. This specific weight fraction is particularly preferred in the case of a phosphor compound which comprises SrSiON:Eu.

The phosphor compound therefore does not comprise a Tb-containing constituent, such as LAP, CAT or CBT, for example, as is the case in the prior art, but in particular comprises SrSiON or an orthosilicate. These constituents of the green-emitting phosphor compound according to the invention are also used instead of Mn-containing compounds known from the prior art, such as ZnS:Mn or BAM:Eu, Mn, for example.

Provision can be made for the phosphor compound according to the invention and/or at least one of the advantageous embodiments to comprise exclusively the respectively mentioned compositions and therefore not to comprise any further chemical constituents. However, provision can also be made for this not to be an exhaustive list of components, but for the phosphor compound according to the invention and/or an advantageous embodiment thereof to furthermore also possibly comprise further chemical constituents, in particular further phosphors.

Explicit mention is made of the fact that all of the chemical formulae of the constituents which are cited for the phosphor compound are considered to be ideal formulae, but that all of the compounds which go beyond these ideal formulae with (slight) deviations in terms of the stoichiometry are also explicitly included in the scope of the invention. This applies in particular to deviations at which the crystal structure remains the same and the deviations in the emission and absorption spectra differ in terms of the peak position by less than 1% and in terms of the peak width by less than 5%.

Ideal formulae for a few further phosphors or constituents of the phosphor compound are added by the following list:

CAT denotes $(Ce,Tb)MgAl_{11}O_9$; LAP denotes $(La,Ce,Tb)PO_4$; BAM denotes $(Ba,Eu)MgAl_{10}O_{17}$; BAMMn denotes $(Ba,Eu)(Mg,Mn)Al_{10}O_{17}$; CBT denotes $(Gd,Ce,Tb)(Mg,Zn,Mn)B_5O_{10}$; SCAP denotes $(Sr,Ba,Ca,Mg,Eu)_5(F,Cl)(PO_4)_3$; SCAPMn denotes $(Sr,Ba,Ca,Mg,Eu,Mn)_5(F,Cl)PO_4)_3$; zinc silicate denotes $(Zr,Mg,Mn),_2SiO_4$; YOE denotes $Y_2O_3$:Eu.

Furthermore, the invention relates to a discharge lamp with a discharge vessel, with a phosphor coating being formed on the inner side of said discharge vessel. The phosphor coating comprises a phosphor compound according to the invention or an advantageous embodiment thereof. By using a phosphor according to the invention in the interior of the discharge lamp it is possible to provide an embodiment which is more cost-effective than the prior art, with the efficiency of the discharge lamp which emits green light possibly also being improved. Furthermore, the luminous efficiency can also be increased.

Preferably, the phosphor coating is formed directly on the inner side of the discharge vessel.

Preferably, the phosphor compounds of the phosphor coating are surrounded by a protective coating, with the result that the phosphor grains or phosphor compounds are embedded in the protective coating.

Provision can be made for the material components of the protective coating to be different than those of the phosphor compound.

Criteria for the suitability of phosphors for application in fluorescent and compact fluorescent lamps can be considered to be the fact that the stability with respect to the exciting radiation is provided and that there is a low degree of affinity with respect to Hg and therefore a low level of absorption of Hg during lamp operation. A further criterion can be considered to be the stability in water, which means that the environmentally friendly coating processes which are conventional nowadays and in which water-based suspension is used can be implemented.

The mentioned criteria can be met particularly preferably by the abovementioned protective coating, which surrounds the phosphor compounds of the phosphor coating. Preferably, in the case of this coating a protective coating which is as dense and thin as possible is formed around the individual phosphor grains. This protective coating differs in terms of its composition from the composition in the interior of the phosphor grain or from the central composition. The composition of the surface can be determined, for example, by surface-sensitive methods such as XPS or SNMS, and the central composition of the phosphor can be determined by volume-sensitive methods such as EDX, RFA or chemical analysis, for example.

Provision can be made for the protective coating to comprise a metal oxide. For example, $Al_2O_3$, $Y_2O_3$ or $SiO_2$ can be provided as metal oxide. Provision can also be made for the protective coating to comprise borates or phosphates. It can likewise comprise fluorides. It is likewise possible for the protective coating to comprise ternary materials such as aluminum borates or aluminum phosphates, for example.

In general, metal oxides or a material with a positive surface charging in water should be provided since they tend to reduce the absorption of Hg. $Al_2O_3$ and $Y_2O_3$ are therefore particularly suitable.

On the other hand, protective coatings can also often be produced inexpensively to be particularly thin and dense from $SiO_2$ and result in an improvement of the radiation stability and the water stability, with the result that they are used despite the relatively low surface charging and the tendency towards increased absorption of Hg.

Preferably, such phosphor compounds of the phosphor coating which are coated and therefore surrounded by a protective coating are used in the discharge lamp.

The discharge lamp is in particular in the form of an Hg low-pressure discharge lamp.

Potential applications of such discharge lamps are, for example, light-emitting components used in traffic control for producing traffic signals. Furthermore, such discharge lamps can be used for emergency exit displays. A corresponding application can also be provided for camping lights or effect lighting.

In particular, with the phosphor according to the invention or with the phosphor compound according to the invention there is the possibility of using orthosilicates which have different color loci.

Provision can be made for the phosphor compound according to the invention and/or at least one of the advantageous embodiments to exclusively consist of the respectively mentioned compositions and therefore not to comprise further chemical constituents. However, provision can also be made for this not to be an exhaustive list of components, but for the phosphor compound according to the invention and/or an advantageous embodiment thereof furthermore also to possibly comprise further chemical constituents, in particular further phosphors.

BRIEF DESCRIPTION OF THE DRAWINGS

An exemplary embodiment of the invention will be explained in more detail below with reference to the schematic drawings, in which.

PREFERRED EMBODIMENT OF THE INVENTION

Figure 1:
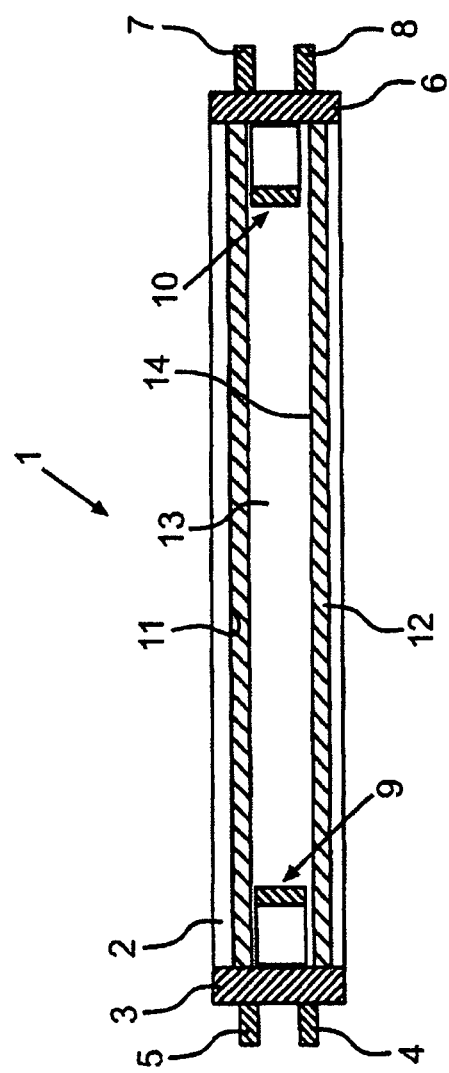
FIG. 1 shows a schematic sectional illustration of a discharge lamp according to the invention.

FIG. 1 shows a schematic sectional illustration of a discharge lamp 1, which is in the form of an Hg low-pressure discharge lamp. The discharge lamp 1 is bar-shaped and comprises a tubular discharge vessel 2, which is a glass bowl. A base 3, which has outwardly extending electrical contacts 4 and 5, is fitted on one end of the discharge vessel 2. A base 6 on which outwardly extending electrical contacts 7 and 8 are fixed is likewise arranged on the opposite side of the discharge vessel 2. These electric contacts 7 and 8 are electrically connected to an electrode 10, which extends into the discharge space 13 of the discharge vessel 2, via power supply lines. Correspondingly, the electric contacts 4 and 5 are connected to power supply lines which are connected to a further electrode 9, with this electrode 9 also extending in the discharge space 13 of the discharge vessel 2.

A phosphor coating 12 is formed on an inner side 11 of the discharge vessel 2, and this phosphor coating 12 extends over the entire length of the discharge vessel 2 in the exemplary embodiment. In the exemplary embodiment, the phosphor coating 12 is formed directly on the inner side 11. In the embodiment shown, only the phosphor coating 12 is illustrated, but it is possible for provision to be made for a further coating to be formed also on the upper side 14 facing the discharge space 13 and therefore on the upper side 14 facing away from the inner side 11 of the discharge vessel 2. This further coating can be, for example, a protective coating for the phosphor compounds of the phosphor coating 12. A further phosphor coating can likewise be formed directly or indirectly on this upper side 14. Provision can likewise be made for a further coating to be arranged and formed between the phosphor coating 12 and the inner side 11.

The phosphor coating 12 comprises a large number of phosphor grains or phosphor compounds, with a phosphor compound having an emission spectrum in the green spectral region and being designed to absorb a radiation emitted by an Hg source in the visible spectral region and to convert this visible radiation from the Hg source into the emission spectrum of the phosphor compound.

An Hg source is understood to mean a mercury atom or a mercury ion which is excited during the low-pressure discharge in the discharge space 13 by the electrons emitted by an electrode 9 or 10 and which emit the mentioned radiation.

The phosphor compounds in the phosphor coating 12 emit a suitable spectrum with the appropriate color locus.

Preferably, a phosphor compound is designed in such a way that, at a wavelength of 254 nm, at which the primary intensity of the Hg low-pressure discharge is emitted, it provides a very high level of absorption, at wavelengths of less than 440 nm, it provides a high level of absorbtion, and, in the wavelength region greater than 530 nm, it provides a low level of absorption. Furthermore, the phosphor compound is designed in such a way that green emission with a dominant wavelength of between 500 nm and 565 nm is provided.

In particular, the discharge lamp 1 with the phosphor coating 12 designed with the phosphor compounds is designed in such a way that a dominant wavelength in the region of 555 nm occurs.

The exemplary embodiment provides that a phosphor compound of the phosphor coating 12 is doped with europium. In particular when the phosphor compound is SrSiON:Eu, the doping with europium is between 1% and 2%.

Provision can also be made for the phosphor compound to be an orthosilicate doped with europium, with the orthosilicate being formed from the general formula $(Ba,Sr,Ca)_2SiO_4$.

The phosphor compounds are preferably surrounded by a protective coating consisting of metal oxides, a borate, a phosphate or a ternary material.

Light with the light color 66 is emitted by the phosphor compound.

Figures 2, 3:
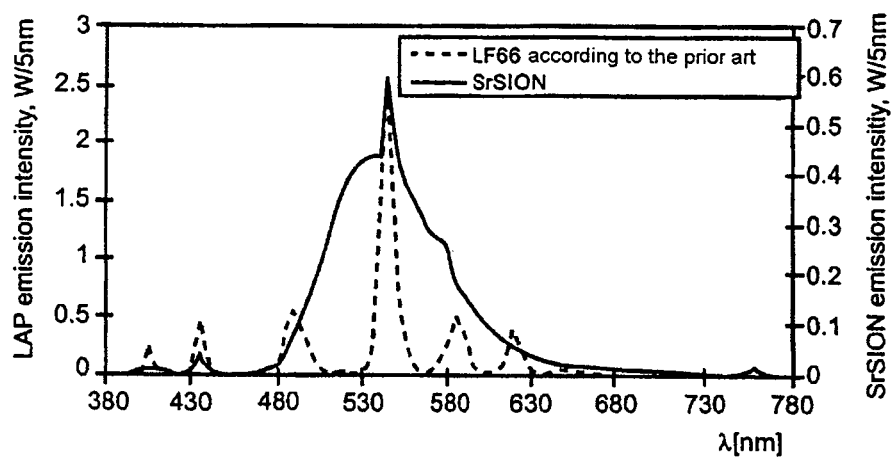
FIG. 2 shows a graph in which an emission spectrum of a phosphor known from the prior art and an embodiment of a phosphor compound according to the invention are illustrated.
FIG. 3 shows a table listing light-engineering properties of a phosphor from the prior art and properties of embodiments of a phosphor compound according to the invention.

FIG. 2 shows a graph showing the emission spectrum of a phosphor (light color 66) known from the prior art as illustrated by the dashed line and a constituent, comprising the constituent SrSiON, of a phosphor according to the invention or of a phosphor compound according to the invention. The profile known from the prior art and illustrated by the dashed line relating to the known phosphor refers to the phosphor LAP. It can clearly be seen that the two spectra differ from one another, as a result of which the improved properties of a phosphor compound according to the invention can also be identified.

FIG. 3 shows a table indicating, in the first two lines, exemplary embodiments of phosphor compounds according to the invention with their chromaticities or standard color value components x and y. Furthermore, the dominant wavelength lam_dom and the color saturation as a percentage are also given. In the last line, by way of comparison, the corresponding values and parameters for the phosphor LAP known from the prior art are indicated. It can be seen that given substantially the same standard color value components, a significantly higher color saturation can be achieved with the embodiments of the phosphor compound according to the invention in comparison with the phosphor known from the prior art.

The invention claimed is:

1. A doped phosphor compound having a protective coating for a discharge lamp, wherein the phosphor compound has an emission spectrum in the green spectral region and will absorb radiation emitted by an Hg source in the visible spectral region and convert visible radiation from the Hg source into the emission spectrum of the phosphor compound, said phosphor compound being doped with Eu and comprising an orthosilicate of the formula $(Ba, Sr, Ca)_2SiO_4$:Eu and/or SrSiON:Eu, the phosphor compound being surrounded by a protective coating, said protective coating being selected from at least one of a borate, a phosphate, a ternary material and a fluoride.

2. The doped phosphor compound having a protective coating as claimed in claim 1, wherein the phosphor compound has a high level of absorption for radiation with wavelengths of less than 440 nm and a very high level of absorption for radiation with a wavelength of approximately 254 nm.

3. The doped phosphor compound having a protective coating as claimed in claim 1, wherein the phosphor compound has a low level of absorption for radiation with a wavelength of greater than 530 nm.

4. The doped phosphor compound having a protective coating as claimed in claim 1, wherein the emission spectrum of the phosphor compound has a dominant wavelength of between 500 nm and 565 nm.

5. The doped phosphor compound having a protective coating as claimed in claim 1, wherein the full width at half maximum of the emission bands of the phosphor compound is less than 100 nm.

6. The doped phosphor compound having a protective coating as claimed in claim 1, wherein the weight fraction of the Eu doping is between 0.1% and 15%.

7. The doped phosphor compound having a protective coating as claimed in claim 6, wherein the weight fraction of the Eu doping is between 1% and 2%.

8. A discharge lamp with a discharge vessel, with a phosphor coating being formed on the inner side of said discharge vessel, wherein the phosphor coating comprises the doped phosphor compound having a protective coating as claimed in claim 1.

9. The discharge lamp as claimed in claim 8, wherein the phosphor coating is formed directly on the inner side of the discharge vessel.

10. The discharge lamp as claimed in claim 8, wherein the protective coating is formed of aluminum borate and/or aluminum phosphate.

11. The discharge lamp as claimed in claim 8 which is in the form of an Hg low-pressure discharge lamp.

12. The doped phosphor compound having a protective coating as claimed in claim 1, wherein the protective coating is selected from the group consisting of one or both of aluminum borate and aluminum phosphate.

* * * * *